TABLE II

| Suitable Esters | Benzoic | | | p-Chloro-benzoic | | | o-Chloro-benzoic | | | 3,4-Dichloro-benzoic | | | 2,4-Dichloro-benzoic | | |
|---|---|---|---|---|---|---|---|---|---|---|---|---|---|---|---|
| | Heat Stability | Light Stability | Spew | Heat Stability | Light Stability | Spew | Heat Stability | Light Stability | Spew | Heat Stability | Light Stability | Spew | Heat Stability | Light Stability | Spew |
| Phenol | G | | | G | F | | G− | F | | G | F | Crystals | G | F | Crystals |
| p-Chlorophenol | F− | E | G | G− | E | G | G | G | G | G | G | Crystals | G | G | Crystals |
| o-Chlorophenol | G | G | G | G− | F | G | G− | F | G | G | G | Crystals | G | F | Crystals |
| 2,4,6-Trichlorophenol | G | G− | G | G | G | G | G | G | G | G | G | G | F | F | Crystals |
| Pentachlorophenol | G | G | Crystals | G | Crystals | — | G | Crystals | — | G | G | — | F | G | — |
| 2,4-Dichlorophenol | F | G− | Crystals | Crystals | — | — | G | Crystals | — | G | Crystals | — | G | Crystals | — |
| 2,4,5-Trichlorophenol | | Crystals | | | — | | | — | | | — | | | — | |

PHENOLIC COMPONENT OF CHLOROESTER

ACID COMPONENT OF CHLOROESTER

Patented Jan. 12, 1954

2,666,039

UNITED STATES PATENT OFFICE 2,666,039

STABILIZING AND PLASTICIZING VINYL-IDENE CHLORIDE RESINS

Robert J. Reid, Canal Fulton, and William Mayo Smith, Jr., Cuyahoga Falls, Ohio, assignors to The Firestone Tire & Rubber Company, Akron, Ohio, a corporation of Ohio Application December 22, 1952, Serial No. 327,252

6 Claims. (Cl. 260—31.2)

This invention relates to the stabilizing and plasticizing of crystalline polymers and copolymers of vinylidene chloride.

The problem of providing plasticizers and heat- and light-stabilizers for vinylidene chloride polymers and copolymers is a difficult one, not heretofore solved to complete satisfaction. On account of their crystalline nature, whereby the resin molecules prefer contact with each other rather than with diluent molecules, they tend to reject and spew the majority of conventional plasticizers and stabilizers. Moreover these resins are processed at rather elevated temperatures, at which many conventional resin compounding ingredients tend to decompose, which further complicates the problem of compounding these resins.

Accordingly it is an object of this invention to provide novel and satisfactory compounding agents for incorporation into vinylidene chloride resins.

A further object is to provide such compounding agents which will serve simultaneously a number of purposes, particularly the purposes of plasticisation and heat- and light-stabilization.

Another object is to provide such agents which will be readily and stably compatible with the vinylidene chloride resins.

Another object is to provide such compounding agents which will not be adversely affected by the high temperatures of processing of crystalline vinylidene chloride resins.

A further object is to provide such stabilizers which will have a high degree of effectiveness.

A still further object is to provide such stabilizers which will be non-toxic and non-allergenic.

The invention will be described in connection with the accompanying drawing, which is a table showing the range of ingredients falling within the ambit of this invention.

SYNOPSIS OF THE INVENTION

The above and other objects are secured, in accordance with this invention, by the incorporation into a crystalline vinylidene chloride polymer or copolymer, of from about 0.5 to 10.0%, based on the weight of such polymer or copolymer, of any of certain chlorine-substituted phenyl benzoates listed herewith:

Table I

Phenyl p-chlorobenzoate
Phenyl o-chlorobenzoate
p-Chlorophenyl benzoate
p-Cholorphenyl p-chlorobenzoate
p-Chlorophenyl o-chlorobenzoate
p-Chlorophenyl 3,4-dichlorobenzoate
o-Chlorophenyl benzoate
o-Chlorophenyl p-chlorobenzoate
o-Chlorophenyl o-chlorobenzoate
2,4,6-trichlorophenyl benzoate
2,4,6-trichlorophenyl p-chlorobenzoate
2,4,6-trichlorophenyl o-chlorobenzoate
2,4,6-trichlorophenyl 3,4-dichlorobenzoate
2,4,6-trichlorophenyl 2,4-dichlorobenzoate
Pentachlorophenyl benzoate.

These suitable chlorinated phenyl benzoates are indicated in Table II of the drawing, in which each block represents the chloro ester produced from (A) the (chloro) phenol set out at the left of the row in which the block appears and (B) the (chloro) benzoic acid set out at the head of the column in which the block appears. The hatched line surrounds the squares representing the esters suitable for use in this invention.

The chlorine-substituted phenyl benzoates may be incorporated with the vinylidene chloride resins to the extent of from 0.5 to 10.0%, and preferably 3% to 8%, based on the total weight of resin and ester in the composition, and will be stably retained therein. The esters provide excellent plasticisation and also a very substantial measure of heat- and light-stabilization for the resins in which they are incorporated.

THE CRYSTALLINE VINYLIDENE CHLORIDE POLYMER AND COPOLYMERS

The resins forming the basis of the compositions of this invention are a well-known class of polymers of vinylidene chloride and copolymers thereof with not more than 15% of other unsaturated compounds copolymerizable therewith, and correspondingly containing at least 85% of vinylidene chloride copolymerized therein. Such resins are characterized by crystalline behavior, i. e. they fuse sharply to form relatively fluid melts which may be extruded, quenched and oriented to form strong filaments of crystalline character. A syndrome of this crystalline habit is the recalcitrance of these resins to compounding: the macro-molecules of polyvinylidene chloride prefer contact with each other and tend to reject any foreign substances such as plasticisers, stabilizers and the like. It is therefore very difficult to provide suitable compounding agents for these resins, and specifically to provide mutually compatible stabilizing agents therefor.

As noted above, the base resin may be a homopolymer of vinylidene chloride, or a copolymer thereof with other unsaturated compounds, which copolymer must contain at least 85% of vinylidene chloride copolymerized therein. Suitable comonomers for this purpose include for example vinyl chloride, vinyl fluoride, vinyl acetate, styrene, acrylic and methacrylic esters such as methyl methacrylate, ethyl acrylate and the like, acrylonitrile, methacrylonitrile, vinyl-type ethers and ketones such as methyl vinyl ether, methyl vinyl ketone and related compounds such as methyl isopropenyl ketone and the like. For a more complete list of compounds known to copolymerize with vinylidene chloride see Krczil "Kurzes Handbuch der Polymerisationstechnik" Vol. II "Mehrstoffpolymerization" Edwards Bros. Inc. p. 739, the items indented under "vinylidene chloride."

With the foregoing general discussion in mind, there are given herewith detailed examples of the practice of this invention. All parts given are by weight.

*Example*

| | Parts |
|---|---|
| Copolymer of 85% vinylidene chloride, 15% vinyl chloride | 10 |
| Glycidyl phenyl ether | 0.2 |
| Benzoate compound under test (per Table II in the drawing) | 0.8 |

A series of test compositions was made up in accordance with the foregoing recipe, using various chlorine-substituted phenyl benzoates (both within and outside the scope of this invention) in the several compositions. In each case the selected compound and the other ingredients, in the proportions listed in the recipe, were slurried with acetone and dried with stirring until the mass was pulverulent. The mass was then spread out to dry for 24 hours, at the end of which time the odor of acetone was no longer detectable. Tests were conducted on the compositions as follows:

*Heat stability.*—Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was (1) heat with steam at 120 pounds per square inch, and mold pressure of 1000 pounds per square inch for three minutes, (2) water cooling under 1000 pounds per square inch mold pressure for two minutes, and (3) ejection from the press. The resultant cylindrical button (1.25 inches in diameter × .125–.138 inch in height) was then cut into sector-shaped specimens which were placed in a forced-draft oven at 180° C. Specimens were removed at intervals of 10, 20 and 30 minutes after placing in the oven, and the behavior of the specimens on the test as a whole rated subjectively by the operator as "Excellent" (E), "Good" (G), "Fair" (F) or "Poor" (P). The results are set forth in Table II in the drawing.

*Light stability.*—A one-gram sample of the composition under test was placed between cellophane sheets and pressed in a flat platen laboratory press under a total load of 1000 pounds at a temperature of 180° C., yielding a plaque approximately 6–8 mils thick. A specimen of the plaque was exposed in a Standard X-1-A Weatherometer, using a Corex D filter and operating without the sprays, and the behavior thereof under the test rated subjectively by the operator as "Excellent" (E), "Good" (G), "Fair" (F) or "Poor" (P). The results are set forth in Table II.

*Spew.*—A plaque was prepared from the composition under test as described under "light stability," the plaque being removed hot from the press and immediately quenched in cold water. A strip ⅜ inch wide was cut from the plaque, the cellophane removed and the strip stretched to orient it to the limit. The strip was then sandwiched between sheets of glassine paper, and the sandwich kept flat under the weight of a glass plate for 60 hours at room temperature. The degree of spew was visible on the glassine sheets, and the behavior of the composition in the test subjectively rated by the operator as "Excellent" (E), "Good" (G), "Fair" (F), "Poor" (P) or "crystals" (when crystals of the compounding agent were observed on the surface of the plaque). The results are incorporated in Table II on the drawing.

The results of the above tests are summarized in Table II, in which each box contains the results obtained with the ester made by esterifying the (chloro) phenol at the left of the row in which the box appears with the (chloro) benzoic acid at the head of the column in which the box appears. Within each box, the rating for heat stability appears at the left upper corner, the rating for light stability at the right upper corner, and the rating for spew in the central lower portions, in positions corresponding to the positions of the legends denoting these properties at the head of each column. It will be evident that those esters coming within the ambit of this invention (i. e., those lying inside the heavy hatched lines) afford an outstanding concurrence of heat- and light-stability, and of compatibility. Particularly excellent results were obtained with p-chlorophenyl p-chlorobenzoate; p-chlorophenyl benzoate; o-chlorophenol benzoate; and pentachlorophenyl benzoate.

From the foregoing general discussion and detailed specific examples, it will be evident that this invention provides novel plasticisers for vinylidene chloride resins, which plasticisers are stably compatible with these resins in large proportions and also impart a considerable degree of heat and light stability thereto. The chlorine substituted phenyl benzoates employed in this invention are readily and cheaply procurable.

What is claimed is:

1. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of a chlorosubstituted phenyl benzoate selected from the group consisting of the following compounds:

Phenyl p-chlorobenzoate
Phenyl o-chlorobenzoate
p-Chlorophenyl benzoate
p-Chlorophenyl p-chlorobenzoate
p-Chlorophenyl o-chlorobenzoate
p-Chlorophenyl 3,4-dichlorobenzoate
o-Chlorophenyl benzoate o-Chlorophenyl p-chlorobenzoate
o-Chlorophenyl o-chlorobenzoate
2,4,6-trichlorophenyl benzoate
2,4,6-trichlorophenyl p-chlorobenzoate
2,4,6-trichlorophenyl o-chlorobenzoate
2,4,6-trichlorophenyl 3,4-dichlorobenzoate
2,4,6-trichlorophenyl 2,4-dichlorobenzoate
Pentachlorophenyl benzoate 2. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of o-chlorophenyl benzoate.

3. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of p-chlorophenyl benzoate.

4. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of p-chlorophenyl p-chlorobenzoate.

5. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of penta-chlorophenyl benzoate.

6. A plasticised, heat- and light resistant, stably compatible composition comprising a resin selected from the group consisting of homopolymers of vinylidene chloride and copolymers thereof with up to 15%, based on the weight of said copolymers, of other unsaturated compounds copolymerizable therewith, together with from 0.5 to 10%, based on the weight of said resin, of 2,4,6-trichlorophenyl p-chlorobenzoate.

ROBERT J. REID.
W. MAYO SMITH, Jr.

References Cited in the file of this patent

UNITED STATES PATENTS

| Number | Name | Date |
|---|---|---|
| 2,157,068 | Carruthers | May 2, 1939 |